United States Patent
Taft et al.

(10) Patent No.: US 12,355,665 B2
(45) Date of Patent: Jul. 8, 2025

(54) SYSTEMS AND METHODS FOR PACKET MANAGEMENT

(71) Applicant: VERIZON PATENT AND LICENSING INC., Basking Ridge, NJ (US)

(72) Inventors: David Taft, Keller, TX (US); Anthony Clay Reynolds, Rhome, TX (US); Lap Tse, Marietta, GA (US); Raquel Morera Sempere, Weehawken, NJ (US); Sudhakar Reddy Patil, Flower Mound, TX (US); Luay Jalil, Allen, TX (US); Nicklous D. Morris, Trophy Club, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 369 days.

(21) Appl. No.: 17/858,543

(22) Filed: Jul. 6, 2022

(65) Prior Publication Data

US 2024/0015101 A1    Jan. 11, 2024

(51) Int. Cl.
*H04L 45/74* (2022.01)
*H04L 45/00* (2022.01)
*H04L 45/302* (2022.01)
*H04L 47/32* (2022.01)

(52) U.S. Cl.
CPC .............. *H04L 45/74* (2013.01); *H04L 45/34* (2013.01); *H04L 47/32* (2013.01); *H04L 45/302* (2013.01)

(58) Field of Classification Search
CPC ......... H04L 45/74; H04L 45/34; H04L 47/32; H04L 45/306; H04L 61/4511; H04L 45/302; H04W 40/12; H04W 40/22
See application file for complete search history.

(56) References Cited

U.S. PATENT DOCUMENTS

| | | | |
|---|---|---|---|
| 2023/0254914 A1* | 8/2023 | Williams | H04L 41/0895 370/328 |
| 2024/0179088 A1* | 5/2024 | Dhamija | H04L 41/147 |
| 2024/0224163 A1* | 7/2024 | Starsinic | H04W 48/12 |
| 2024/0340782 A1* | 10/2024 | Atarius | H04W 48/18 |
| 2024/0357470 A1* | 10/2024 | Lv | H04L 61/4511 |

* cited by examiner

*Primary Examiner* — Oussama Roudani

(57) ABSTRACT

Embodiments described herein allow reduced latency and computational costs by identifying a slice associated with a packet and determining an action to be performed with respect to the packet without having to perform deep packet inspection on the packet. An aspect of the present disclosure is a method comprising receiving a packet including a slice identifier corresponding to a slice of a network, the slice identifier having a plurality of bits; determining a bit value for each bit in a subset of the plurality of bits; and performing an action with respect to the packet based on the bit value of at least one bit in the subset.

20 Claims, 5 Drawing Sheets

SYSTEMS AND METHODS FOR PACKET MANAGEMENT

BACKGROUND

The introduction of network slicing to communications and data networks allows for the dynamic logical segmentation of network elements without additional physical infrastructure. A network slice (NS) may comprise a set of network elements including network function (NF) instances and other resources (e.g., computing, storage, and networking resources). Elements within the NS may identify each other using a corresponding network slice identifier.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
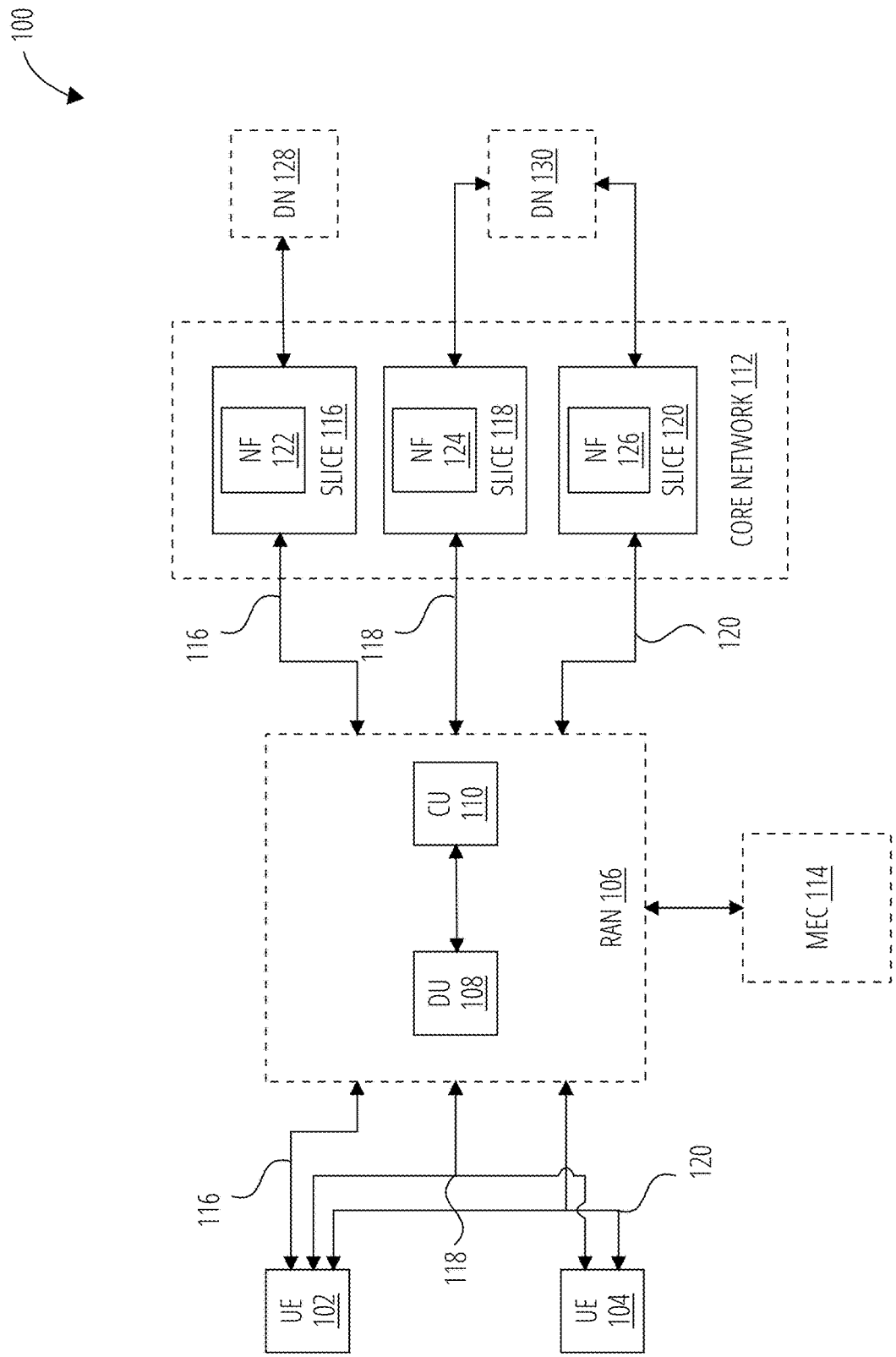
FIG. 1 is a block diagram of a communications network architecture according to some embodiments of the present disclosure.

Current implementations of network slicing rely on the use of identifiers (e.g., Single Network Slice Selection Assistance Information (S-NSSAI)) for slice identification. According to some embodiments, a S-NSSAI can be composed of a Slice Service Type (SST) and a Slice Differentiator (SD). Service operators can customize the SD information according to internal requirements.

While current Radio Access Network (RAN) and Core Network provides some functionality for the analysis and interpretation of a slice identifier, traditional transport domain elements (e.g., routers and switches) do not natively parse header information where the slice identifier exists within the packet. Therefore, transport domain elements must disassemble each packet and perform deep packet inspection prior to identifying the network slice associated with the packet. This process is repeated for every packet received by the transport domain element regardless of whether the transport element has to perform an action with respect to the packet or not.

Embodiments described herein allow reduced latency and computational costs by identifying a slice associated with a packet or an action to be performed with respect to the packet without having to perform deep packet inspection on each packet. This approach may be referred to as transport awareness.

In some embodiments, an address associated with a packet is encoded with a slice identifier to allow transport domain elements and NFs (e.g., from a RAN, a core network, or transport element) to identify the slice or some other parameter related to a given packet without having to perform deep packet inspection. In some embodiments, the address is an IPv6 address. In some embodiments, the slice identifier is a S-NSSAI. In some embodiments, encoding an IPv6 address includes encoding a segment of the IPv6 address with the S-NSSAI.

In some embodiments, an NF application can analyze the address, extract the slice identifier, determine a bit arrangement for at least a portion of the slice identifier, and determine an action to be performed by the NF with respect to the packet based on the bit arrangement of the portion of slice identifier. In some embodiments, the action can be a deep packet inspection of the packet. In some embodiments, the NF performs an action based on a policy (e.g., an organization policy or a user policy). In some embodiments, a transport element or an NF can determine a priority for the packet based on the slice identifier. In some embodiments, a priority can be a high level priority or a default priority. In some embodiments, the priority can have a numerical value (e.g., 1, 2, 3, etc.). In some embodiments, a transport element or NF can calculate a path for a packet or assign a predetermined path for the packet based on the slice identifier.

In some embodiments, in a RAN configuration with multiple Transmit-Receive Points (TRPs), an NF of the RAN can determine how many TRPs may be required based on the slice identifier and thereby avoid having to set up multiple TRPs when they are not needed.

Turning now to FIG. 1, FIG. 1 is a block diagram of a communications network architecture of network 100 according to some embodiments of the present disclosure. As illustrated, UEs 102-104 are communicatively coupled to a core network 112 (e.g., a 5G core network) via a radio access network, RAN 106. No limit is placed on the type of UE in the network 100.

In one embodiment, UEs 102-104 can communicate with the RAN 106 through a plurality of base stations. In one embodiment, a given UE can connect to a 4G base station or a 5G base station. In some embodiments, a given UE can connect to both a 4G base station and a 5G base station in a dual connectivity setup. In some embodiments, the base stations can be 5G base stations, such as gNodeB base stations. In one embodiment, the UE within a single group may use different radio access technologies.

In some embodiments, RAN 106 can include one or more distributed units, DU 108, and/or central units, CU 110. In some embodiments, DU 108 and CU 110 may be logical nodes providing different base station functions. For example, in some embodiments, a DU 108 can provide Radio Link Control (RLC), Medium Access Control (MAC), and physical layer (PHY) functions. In some embodiments, a CU 110 can provide Radio Resource Control (RRC) and Packet Data Convergence Protocol (PDCP) functions. In some embodiments, DU 108 and CU 110 may include hardware and software components. In some embodiments, one CU 110 can control a plurality of DUs 108. In some embodiments, RAN 106 can include one or more NFs (e.g., CU 110 and DU 108). In some embodiments, an NF of RAN 106 can be a radio unit (RU). In some embodiments, an NF of RAN 106 may be a baseband unit (BBU).

In some embodiments, the RAN 106 can be communicatively coupled to a core network 112. In one embodiment, the core network 112 can comprise a homogenous network. For example, the core network 112 can comprise an LTE core network. Alternatively, the core network 112 can comprise a 5G core network. In one embodiment, the core network 112 can comprise two networks, such as an LTE core network and a 5G core network. In some embodiments, the RAN 106 can be communicatively coupled to Multi-access Edge Computing (MEC) 114 resources. In some embodiments, the MEC 114 can provide services and functions to users and UEs on edge nodes.

FIG. 1 further illustrates end-to-end network slice instances 116, 118, and 120. In some embodiments, slice instances 116, 118, and 120 can include elements (e.g., network functions (NFs)) from UEs 102-104, RAN 106, core network 112, and/or MEC 114. In some embodiments, an end-to-end network slice may be logically segmented into a RAN portion, a transport portion, and a core network portion. In some embodiments, within core network 112, slice instances 116, 118, and 120 can include NFs 122-126, respectively. In some embodiments, each slice may have one or more NFs. In some embodiments, an NF can be an Access and Access & Mobility Management Function (AMF), a Session Management Function (SMF), and a User Plane Function (UPF). In some embodiments, an AMF manages one or more slices.

In one embodiment, slice instances 116, 118, and 120 may group NFs based on the types of services required by the UEs 102-104. For example, in some embodiments, UEs in slice instance 116 can comprise Ultra-Reliable Low Latency Communications (URLLC) devices such as autonomous vehicle computing devices, IoT devices, remote surgery devices, and the like. In some embodiments, UEs in slice instance 118 can comprise enhanced mobile broadband (eMBB) devices such as smartphones, tablets, and the like. In some embodiments, UEs in slice instance 120 can comprise Massive Machine-Type Communications (mMTC) devices such as sensors, meters, and monitoring devices. In some embodiments, mMTC may be referred to as Massive Internet of Things (mIoT). Such groups are exemplary only, and other groupings can be used.

In some embodiments, core network 112 is communicatively coupled to one or more data networks (DN) 128-130. Thus, in some embodiments, different slices may communicate with different data networks. For example, in an embodiment, slice instance 116 communicates with DN 128, while slice instances 118 and 120 communicates with DN 130. In some embodiments, a given UE can be part of more than one slice. For example, in some embodiments, UE 102 can be part of slices 116-120, while UE 104 can be part of slices 118 and 120.

As noted elsewhere, the different elements within network 100 may identify traffic (e.g., packets, requests, or messages) belonging to any given slice using a slice identifier. In some embodiments, the identifier can be a Single Network Slice Selection Assistance Information (S-NSSAI).

Figure 2:
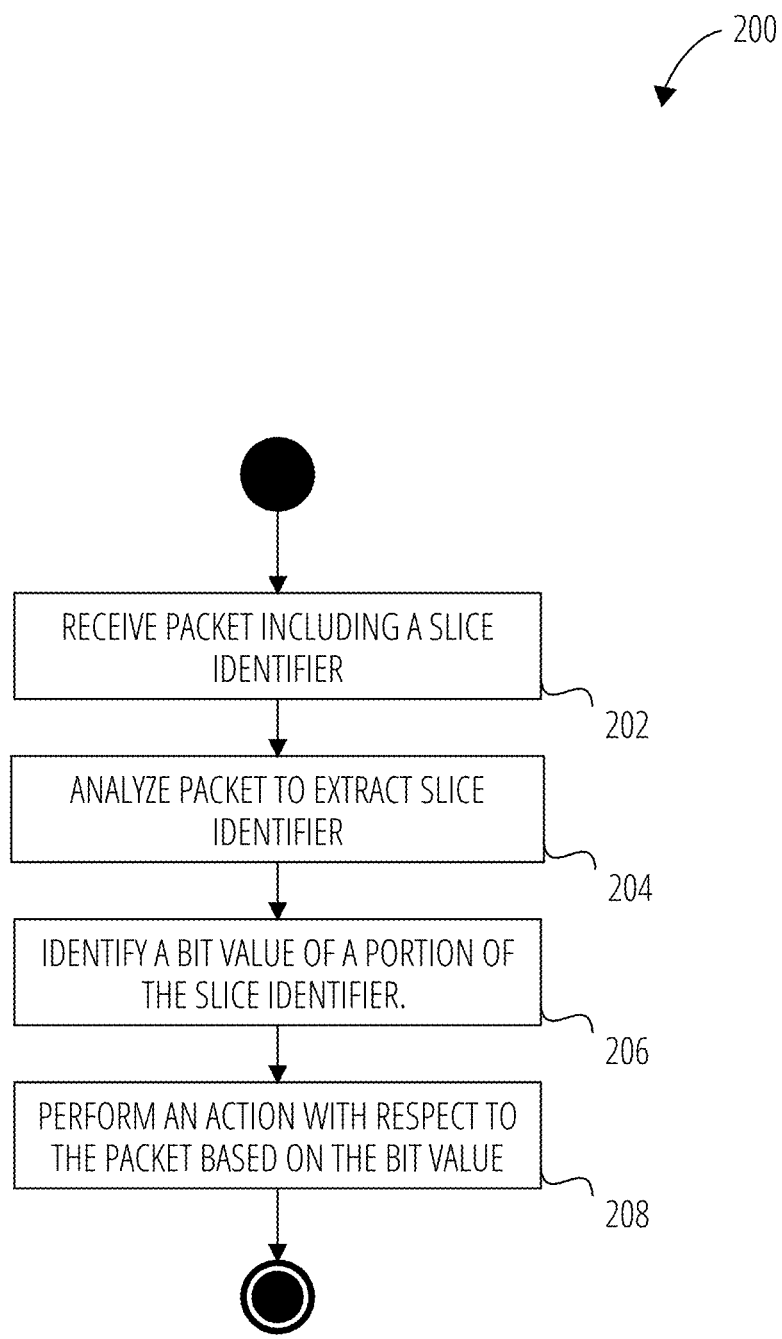
FIG. 2 is a flow diagram illustrating an exemplary process for processing a packet according to some embodiments of the present disclosure.

Turning to FIG. 2, FIG. 2 illustrates a flow diagram of an exemplary Process 200 for processing a packet according to some embodiments of the present disclosure. The components of FIG. 1 will be used to discuss the operations of the steps of Process 200.

In Step 202, a network element (e.g., of a RAN, core network, MEC, or transport domain element) receives a packet. In some embodiments, the network element can be a UE. In some embodiments, the packet can be part of a request or message from another network element. In some embodiments, the network element may be an NF. In some embodiments, the packet may originate from or be directed to a UE. In some embodiments, the packet can include a slice identifier. In some embodiments, the slice identifier may correspond to a network slice of a broader network. In some embodiments, the slice identifier can be included in a header of the packet. In some embodiments, the slice identifier may have a plurality of bits.

In some embodiments, the packet can include an address. In some embodiments, the address may be part of a packet header. In some embodiments, the address can have a plurality of bits. In some embodiments, the address can be an address corresponding to the network element. In some embodiments, the address can be an address corresponding to another network element. In some embodiments, different NFs and UE can have different addresses. As will be discussed in further detail with respect to FIG. 3, in some embodiments, the slice identifier can be encoded in the address.

In Step 204, the network element analyzes the packet to extract the slice identifier. In some embodiments, the packet can be analyzed by an application implemented on the network element. In some embodiments, the application can be implemented on a different network element communicatively connected to the network element. In some embodiments, the network element can first identify an address related to the packet and then extract the slice identifier from the address. In some embodiments, the network element can determine a slice identifier by decoding the address. In some embodiments, the network elements can determine a slice identifier by determining bit values of a segment of the address and comparing the bit values with known bit values corresponding to the address in a database or look-up table accessible by the network element. In some embodiments, the network element can send a request to another network element to provide the slice identifier based on the determined bit values.

In Step 206, the network element can determine bit values for each bit of the slice identifier. In some embodiments, the network element may determine the bit values for a subset of the plurality of bits of the slice identifier. In some embodiments, the network element may determine the bit values for a portion of the slice identifier. In some embodiments, for example, in some embodiments where the slice identifier is a S-NSSAI, the network element may determine the bit values for the SST portion. In some embodiments, the network element may determine the bit values for the SD portion. In some embodiments, the subset of the plurality of bits is a subset of the bits of the SST portion or the SD portion of a S-NSSAI.

In some embodiments, the network element may compare the bit values with known bit values corresponding to different network slices to determine the corresponding network slice for the packet. In some embodiments, the network element may maintain a database of known slice identifiers for different slices of the network.

Optionally, in Step 206, the network element can determine bit values for each bit of an address included in the packet. In some embodiments, the network element can determine the slice identifier from a subset plurality of bits corresponding to the address. In some embodiments, the network element can determine bit values for a subset of the bits corresponding to the address. Then, the network element can use those bit values to determine a slice identifier. In some embodiments, determining the slice identifier can include searching a database or lookup table (LUT) using the bit values of the subset of bits corresponding to the address.

In Step 208, the network element can perform an action with respect to the packet based on the determined bit values. In some embodiments, the action can be a deep packet inspection of the packet. In some embodiments, the action may be related to an organization or user policy. In some embodiments, the network element can determine a priority for the packet based on the bit values. In some embodiments, the priority can be a high priority or a default priority. In some embodiments, the priority can have a numerical value (e.g., 1, 2, 3, etc.).

In some embodiments, in Step 208, the network element can process the packet based on the determined bit values. For example, in an embodiment, where the network element is a DU of a RAN receiving a packet sent by a CU, the DU can perform a deep packet inspection of the packet based on the network slice to which the packet is assigned. In some embodiments, the network element can calculate a path for the packet or assign a predetermined path based on the network slice indicated by the slice identifier.

In some embodiments, a given packet can be treated differently by different NFs based on the slice to which the packet corresponds. For example, in some embodiments, where the network element is a User Plane Function (UPF) of a core network (e.g., a 5G core network), the UPF can forward the packet to a different NF based on the slice identified by the slice identifier without inspecting the packet while a Session Management Function (SMF) can decide to inspect the packet and its contents. Alternatively, in some embodiments, the UPF and/or the SMF can discard or ignore the packet.

In some embodiments, in Step 208, the network element can perform actions not directly related to the packet based on the bit values (e.g., from a slice identifier or an address), identified in Step 206. In some embodiments, different network elements analyzing a given packet can perform different actions in response to the same bit values.

Figure 3:
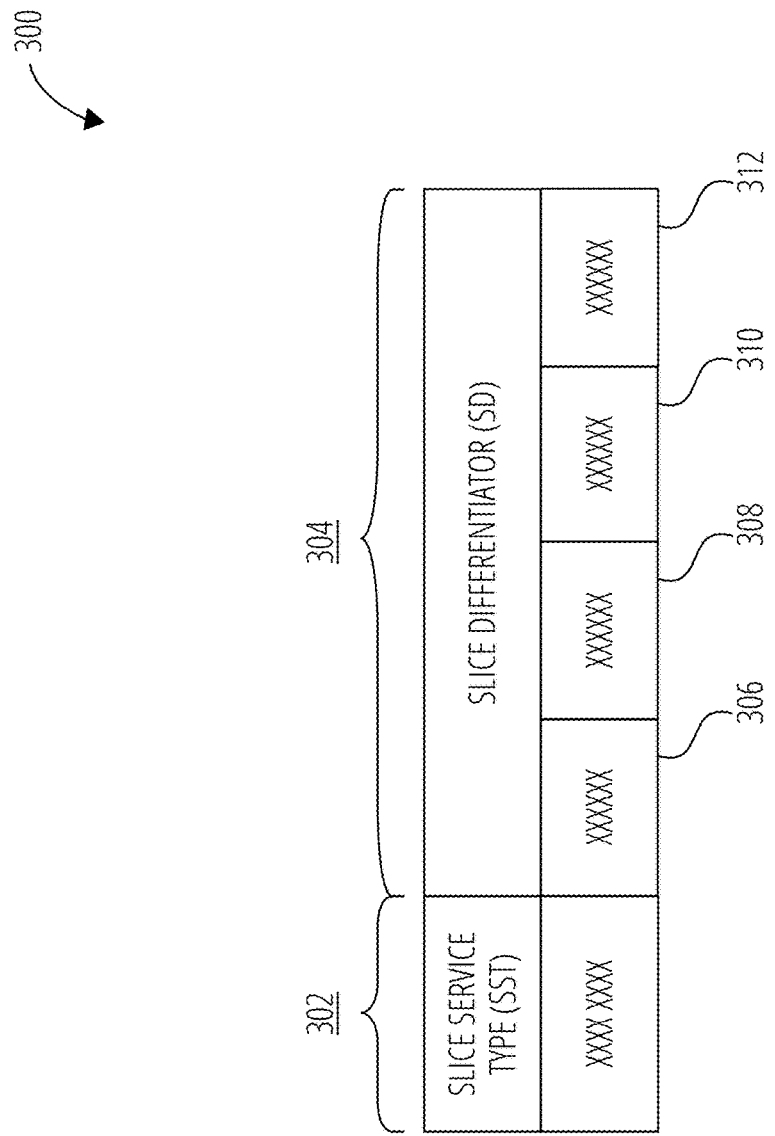
FIG. 3 illustrates a representation of a slice identifier according to some embodiments of the present disclosure.

Turning now to FIG. 3, FIG. 3 illustrates a representation of a slice identifier 300 according to some embodiments of the present disclosure. In some embodiments, the slice identifier 300 can be a S-NSSAI. In some embodiments, slice identifier 300 can include a Slice Service Type (SST) 302 and a Slice Differentiator (SD) 304. In some embodiments, the SST 302 may be 8 bits long. In some embodiments, the SST 302 can include a combination of bits that identifies different types of services for different types of devices (e.g., URLLC, eMBB, and mMTC/mIoT).

In some embodiments, the SD 304 can be referred to as a subset of the slice identifier. In some embodiments, the SD 304 can be segmented into further subsets corresponding to different designations. In some embodiments, a single subset can include all the bits of the SD 304 or can include less than all the bits of the SD 304. In some embodiments, the SD 304 can be 24 bits long. While the embodiment illustrated in FIG. 3 shows all subsets 306-312 having an equal amount of bits (e.g., 6 bits) the disclosure is not so limited. In some embodiments, subsets 306-312 can have different amounts of bits. For example, in an embodiment, subset 306 can be 4 bits long while subsets 308-310 can be 6 bits long and subset 312 can be 8 bits long. As will be understood, SD 304 can have more or less subsets than those shown in FIG. 3 and each subset can have a different or equal amount of bits as another subset.

In some embodiments, different network elements can analyze different bits of the SD 304 differently. For example, in some embodiments, an NF can analyze or process subset 306 and disregard the other bits of SD 304 while a different NF can process subsets 308 and 312 while ignoring subsets 306 and 310. In some embodiments, different bits from of a subset can represent different actions that any given network element may take with respect to a packet containing the slice identifier 300. In some embodiments, one or more of the subsets 306-312 can indicate a network slice. In some embodiments, one or more of the subsets 306-312 can indicate a priority for a packet containing the slice identifier 300. In some embodiments, one or more of the subsets 306-312 can be a type of service associated with the network slice, a UE, or a content of a packet including the slice identifier 300.

For example, in some embodiments, for a given subset of bits A (e.g., subsets 306-310) with corresponding bit values (e.g., 000001b), an NF of a RAN can query a database or LUT to obtain additional or new IP addressing (e.g., a new IPv6 address). In some embodiments, for the same subset of bits an NF of a transport network (e.g., a router) communicatively connected to the RAN can query and configure different interfaces corresponding to the RAN. Still, in some embodiments, for the same subset, an NF of a core network communicatively coupled to the transport network and/or the RAN can determine that no action is required.

Further to the example above, in some embodiments, for a given subset of bits B (e.g., subsets 306-310) distinct from subset of bits A but with the same corresponding bit values (e.g., 000001b) the NF of the RAN can determine that no action is required. In some embodiments, for subset of bits B, the NF of the transport network can query and configure different UPF interfaces. In some embodiments, for subset of bits B, the NF of the core network can query a database to obtain additional or new IP addressing (e.g., a new IPv6 address).

As noted with respect to FIG. 3, in some embodiments, a slice identifier 300 can be encoded in an address included in a packet. In some embodiments, the slice identifier can form part of the address. In some embodiments, the slice identifier can be mapped to the address. In some embodiments, the address can be an IPv6 address. As will be understood, in some embodiments, an IPv6 address can be 128 bits in length and can consist of 8, 16-bit fields or segments. In some embodiments, a representation (e.g., a shortened form or a transformation) of the slice identifier 300 (e.g., S-NSSAI) can be encoded into the IPv6 address. In some embodiments, encoding an IPv6 address includes encoding a segment of the IPv6 address. In some embodiments, a segment of an IPv6 address can be an instance ID. In some embodiments, a slice identifier can be encoded in an instance ID of an IPv6 address. In some embodiments, a slice identifier can be mapped to a segment (e.g., an instance ID) of an IPv6 address.

For example, in some embodiments, network slices w, x, y, and z (e.g., identified by a slice identifier) can be mapped to slice profiles a, b, and c; where slices w and x correspond to a, slice y corresponds to b, and slice z corresponds to c. In those embodiments, a specific bit or sets of bits of a segment of the IPv6 can have a value indicating slice profiles a, b, and c, denoted, for example, by A, B, and C hexadecimal. In an embodiment, IPv6 addresses corresponding to NFs within slices w or x can have a segment with an A on the leftmost bit (e.g., A001h). In another embodiment, IPv6 addresses corresponding to NFs within slices y and z can have each a segment with a B or a C, respectively, on the leftmost bit (e.g., B001h, C001h).

In some embodiments, a same NF can have different addresses depending on the interface used to communicate with other NFs. For example, in some embodiments, a CU and a DU of a RAN can communicate over an F1 interface. In some embodiments, a CU of a RAN can communicate with a UPF of a core network can communicate over an N3 interface. In those embodiments, the address segments indicating a slice to which the NF belongs can be unique to the interface (e.g., F1, Xn, N3, and the like) over which the NF is communicating. For example, in an embodiment, a CU communicating with a DU over an F1 interface in slice x can have an address segment with value A001h while the same CU communicating with a UPF over an N3 interface can have an address segment A003h. In another embodiment, where the CU, DU, and UPF correspond to slice z, the CU can have addresses C001h and C003h to communicate with the DU and UPF over interfaces F1 and N3, respectively.

Figure 4:
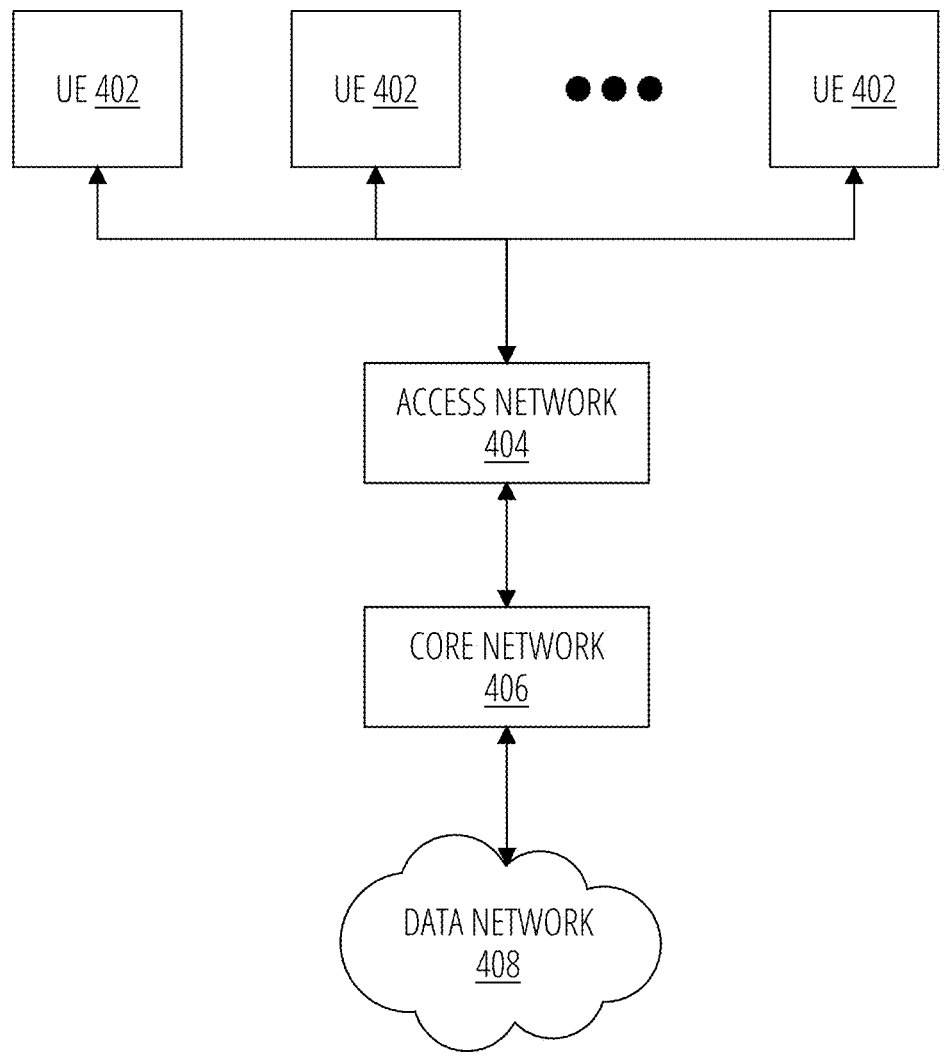
FIG. 4 is a block diagram of an example network architecture according to some embodiments of the present disclosure.

FIG. 4 is a block diagram of an example network architecture according to some embodiments of the present disclosure. In the illustrated embodiment, user equipment ("UE") 402 accesses a data network 408 via an access network 404 and a core network 406. In the illustrated embodiment, UE 402 comprises any computing device capable of communicating with the access network 404 (e.g., device 500 discussed in relation to FIG. 5). As examples, UE 402 can include mobile phones, smart devices, tablets, laptops, sensors, IoT devices, autonomous machines, unmanned aerial vehicles (UAVs), wired devices, wireless handsets, and any other devices equipped with a cellular or wireless or wired transceiver.

In the illustrated embodiment of FIG. 4, the access network 404 comprises a network allowing network communication with UE 402. In general, the access network 404 includes at least one base station that is communicatively coupled to the core network 406. In some embodiments, the at least one base station may or may not be coupled to one or more UE 402.

In some embodiments, the access network 404 comprises a cellular access network, for example, a fifth-generation (5G) network or a fourth-generation (4G) network. In one embodiment, the access network 404 can comprise a Next-Gen Radio Access Network (NG-RAN), which can be communicatively coupled to UE 402. In an embodiment, the access network 404 may include a plurality of base stations (e.g., eNodeB (eNB), gNodeB (gNB)) communicatively connected to UE 402 via an air interface. In one embodiment, the air interface comprises a New Radio (NR) air interface. For example, in a 5G network, UE 402 can be communicatively coupled to each other via an X2 interface, and in some embodiments, for example, such coupling can be via Wi-Fi functionality, Bluetooth, or other forms of spectrum technologies, and the like.

In the illustrated embodiment, the access network 404 provides access to a core network 406 to the UE 402. In the illustrated embodiment, the core network 406 may be owned and/or operated by a network operator (NO) and provides wireless connectivity to UE 402 via access network 404. In the illustrated embodiment, this connectivity may comprise voice and data services.

At a high-level, the core network 406 may include a user plane and a control plane. In one embodiment, the control plane comprises network elements and communications interfaces to allow for the management of user connections and sessions. By contrast, the user plane may comprise network elements and communications interfaces to transmit user data from UE 402 to elements of the core network 406 and to external network-attached elements in a data network 408 such as, but not limited to, the Internet, a local area network (LAN), a wireless LAN, a wide area network (WAN), a mobile edge computing (MEC) network, a private network, a cellular network, and the like. In some embodiments, network elements may be physical elements such as router, servers and switches or may be virtual network functions implemented on physical elements.

In the illustrated embodiment, the access network 404 and the core network 406 may be operated by a NO. However, in some embodiments, the networks (404, 406) may be operated by a private entity, different entities, and the like, and may be closed to public traffic. In these embodiments, the operator of the device can simulate a cellular network, and UE 402 can connect to this network similar to connecting to a national or regional network.

Figure 5:
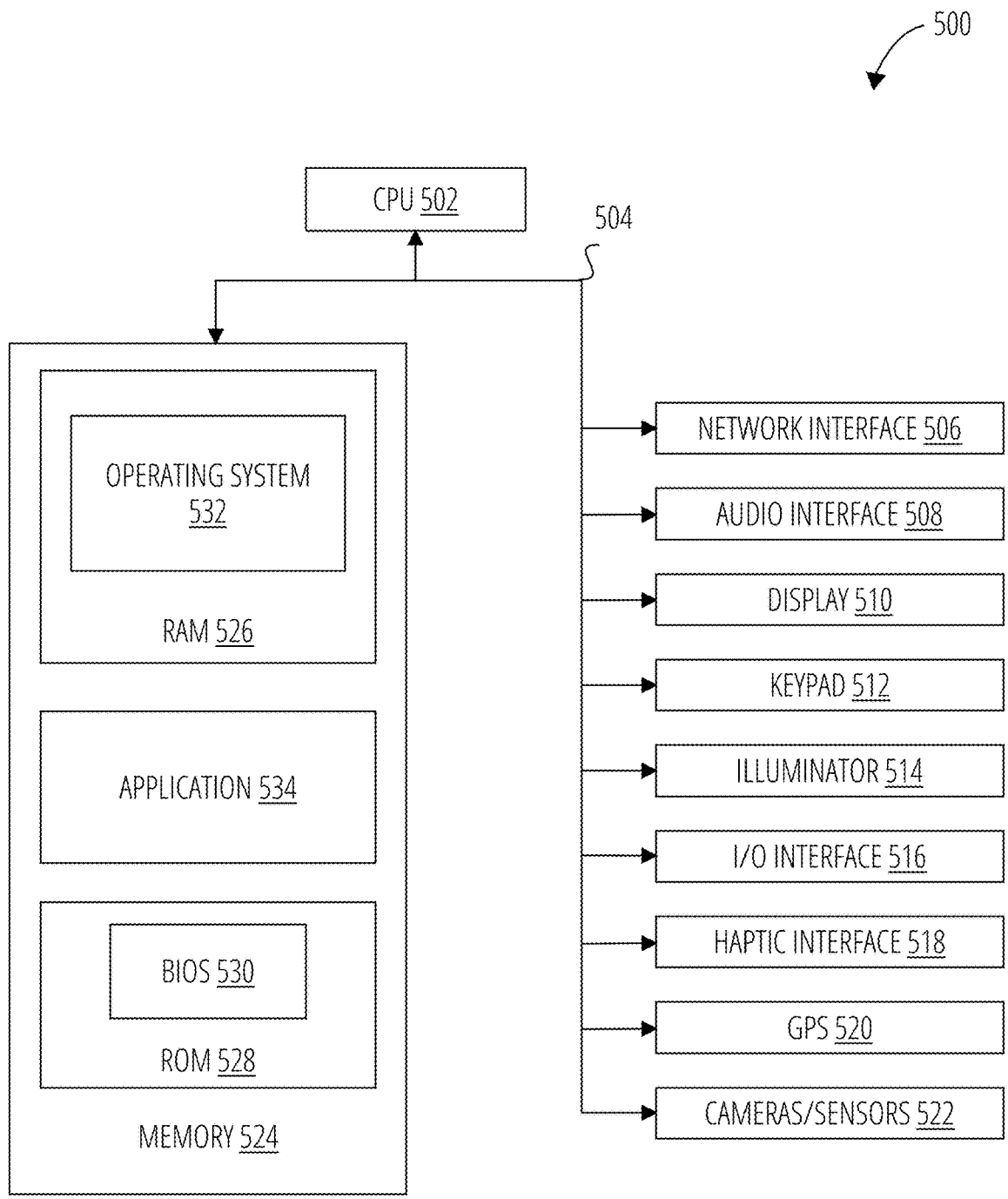
FIG. 5 is a block diagram illustrating a device showing an example of a client or server device used in various embodiments of the present disclosure.

FIG. 5 is a schematic diagram illustrating an example embodiment of a device 500 (e.g., a client device or server device) that may be used in the various embodiments of the present disclosure. Device 500 may include more or fewer components than those shown in FIG. 5. However, the components shown are sufficient to disclose an illustrative embodiment for implementing the present disclosure. Device 500 can be a representation of UE 402 as mentioned above.

As shown in the figure, device 500 includes a processing unit (CPU) 502 in communication with a mass memory 524 via a bus 504. Device 500 also includes one or more network interface 506, an audio interface 508, a display 510, a keypad 512, an illuminator 514, an input/output (I/O) interface 516, a haptic interface 518, an optional global positioning systems (GPS) receiver 520, and one or more cameras or other optical, thermal or electromagnetic sensor 522.

Device 500 may optionally communicate with a base station (not shown), or directly with another computing device. Network interface 506 is sometimes known as a transceiver, transceiving device, or network interface card (NIC).

Mass memory 524 illustrates a non-limiting example of computer storage media for storage of information such as computer readable instructions, data structures, program modules or other data. Mass memory 524 can include random access memory (RAM) 526, read-only memory (ROM) 528, or any other type of memory known or to be known. Mass memory 524 can store a basic input/output system (BIOS) 530 for controlling low-level operation of device 500. The mass memory 524 can also store an operating system 532 for controlling the operation of device 500.

Applications 534 may include computer-executable instructions which, when executed by device 500, transmit, receive, and/or otherwise process audio, video, images, and enable telecommunication with a server and/or another user of another client device.

Device 500 may be referred to as a computing device or a client device, interchangeably. A computing device may be capable of sending or receiving signals, such as via a wired or wireless network, or may be capable of processing or storing signals, such as in memory as physical memory states. A client device may, include a portable and non-portable devices including without limitation, cellphones, tablets, wearables, and integrated or distributed devices combining various features, such as features of the forgoing devices, or the like. In some embodiments, device 500 may operate as a server that can provide processing, database, and communication facilities. In some embodiments, a server may be embodied in a single, physical processor with associated communications and data storage facilities, or it may be a networked or clustered complex of processors and associated network and storage devices (e.g., cloud servers).

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As utilized herein, the terms "comprises" and "comprising" are intended to be construed as being inclusive, not exclusive. As utilized herein, the terms "exemplary," "example," and "illustrative," are intended to mean "serving as an example, instance, or illustration" and should not be construed as indicating, or not indicating, a preferred or advantageous configuration relative to other configurations. As utilized herein, the terms "about," "generally," and "approximately" are intended to cover variations that may existing in the upper and lower limits of the ranges of subjective or objective values, such as variations in properties, parameters, sizes, and dimensions. In one non-limiting example, the terms "about," "generally," and "approximately" mean at, or plus 10 percent or less, or minus 10 percent or less. In one non-limiting example, the terms "about," "generally," and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. Embodiments described herein may be combined or separated without parting from the disclosure. The specification and drawings are accordingly to be regarded in an illustrative rather than restrictive sense. For example, subject matter may be embodied as methods, devices, components, or systems. Accordingly, embodiments may, for example, take the form of hardware, software, firmware or any combination thereof (other than software per se).

What is claimed is:

1. A method comprising:
receiving a packet including a packet header having an IPV6 address, the IPV6 address having a plurality of segments;
analyzing the IPV6 address to identify a segment value for a segment of the IPV6 address;
determining, based on the segment value, a Single Network Slice Selection Assistance Information (S-NSSAI) corresponding to a slice of a network by comparing the segment value to a mapping table that associates IPv6 segment values with corresponding S-NSSAI values, the S-NSSAI having a plurality of bits;

determining bit values for a subset of the plurality of bits, the subset corresponding to fields that indicate different actions; and performing, based on a comparison of the bit values against predefined bit patterns, an action with respect to at least one of the packet and a network function (NF) of the network, different bit patterns within the subset corresponding to different actions to be taken.

2. The method of claim 1, wherein the S-NSSAI includes a Slice Service Type (SST) and a Slice Differentiator (SD), and wherein the subset of the plurality of bits is part of the SD.

3. The method of claim 1, further comprising determining, based on a bit value of at least one bit in the subset, the slice, and wherein performing the action is further based on the slice.

4. The method of claim 1, wherein the packet is received by the NF, the NF having an NF type, and wherein performing the action is further based on the NF type.

5. The method of claim 1, wherein the packet is received by a first NF and the action is performed with respect to a second NF.

6. The method of claim 1, wherein when the action is performed with respect to the packet, the action is selected from the group comprising processing the packet, forwarding the packet without processing it, and discarding the packet.

7. A non-transitory computer-readable storage medium, the computer-readable storage medium including instructions that when executed by a computing device, cause the device to:

receive a packet including a packet header having an IPV6 address, the IPV6 address having a plurality of segments;

analyze the IPV6 address to identify a segment value for a segment of the IPV6 address;

determine, based on the segment value, a Single Network Slice Selection Assistance Information (S-NSSAI) corresponding to a slice of a network by comparing the segment value to a mapping table that associates IPv6 segment values with corresponding S-NSSAI values, the S-NSSAI having a plurality of bits;

determine bit values for a subset of the plurality of bits, the subset corresponding to fields that indicate different actions; and perform, based on a comparison of the bit values against predefined bit patterns, an action with respect to at least one of the packet and a network function (NF) of the network, different bit patterns within the subset corresponding to different actions to be taken.

8. The computer-readable storage medium of claim 7, wherein the S-NSSAI includes a Slice Service Type (SST) and a Slice Differentiator (SD), and wherein the subset of the plurality of bits is part of the SD.

9. The computer-readable storage medium of claim 7, wherein the instructions further configure the computer to determine, based on a bit value of at least one bit in the subset, the slice, and wherein the instructions further configure the computer to perform the action based on the slice.

10. The computer-readable storage medium of claim 7, wherein the packet is received by the NF, the NF having an NF type, and wherein the instructions further configure the computer to perform the action based on the NF type.

11. The computer-readable storage medium of claim 7, wherein the packet is received by a first NF and the action is performed with respect to a second NF.

12. The computer-readable storage medium of claim 7, wherein when the action is performed with respect to the packet, the action is selected from the group comprising processing the packet, forwarding the packet without processing it, and discarding the packet.

13. A device comprising a processor configured to perform a method comprising:

receiving a packet including a packet header having an IPV6 address, the IPV6 address having a plurality of segments;

analyzing the IPV6 address to identify a segment value for a segment of the IPV6 address;

determining, based on the segment value, a Single Network Slice Selection Assistance Information (S-NSSAI) corresponding to a slice of a network by comparing the segment value to a mapping table that associates IPv6 segment values with corresponding S-NSSAI values, the S-NSSAI having a plurality of bits;

determining bit values for a subset of the plurality of bits, the subset corresponding to fields that indicate different actions; and performing, based on a comparison of the bit values against predefined bit patterns, an action with respect to at least one of the packet and a network function (NF) of the network, different bit patterns within the subset corresponding to different actions to be taken.

14. The device of claim 13, wherein the S-NSSAI includes a Slice Service Type (SST) and a Slice Differentiator (SD), and wherein the subset of the plurality of bits is part of the SD.

15. The device of claim 13, wherein the method further comprises determining, based on a bit value of at least one bit in the subset, the slice, and wherein performing the action is further based on the slice.

16. The device of claim 13, wherein the packet is received by the NF, the NF having an NF type, and wherein performing the action is further based on the NF type.

17. The device of claim 13, wherein the packet is received by a first NF and the action is performed with respect to a second NF.

18. The device of claim 13, wherein when the action is performed with respect to the packet, the action is selected from the group comprising processing the packet, forwarding the packet without processing it, and discarding the packet.

19. The method of claim 1, wherein the NF comprises a centralized unit (CU) of a radio access network (RAN), and wherein the IPV6 address includes a first segment value when communicating over a first interface type and a second segment value when communicating over a second interface type, the first and second segment values both corresponding to a same S-NSSAI but being unique to their respective interface types.

20. The method of claim 1, wherein determining the bit values comprises:

identifying a first subset of bits and a second subset of bits within the S-NSSAI;

determining a first action based on the first subset of bits when the NF is a radio access network (RAN) component;

determining a second action based on the first subset of bits when the NF is a transport network component;

determining no action is required based on the first subset of bits when the NF is a core network component; and determining different actions for the second subset of bits based on a type of the NF.

\* \* \* \* \*